United States Patent
Vasiliev et al.

[11] Patent Number: 6,068,902
[45] Date of Patent: May 30, 2000

[54] COMPOSITE SHELL SHAPED AS A BODY OF REVOLUTION, AND PANEL CONNECTION JOINT

[75] Inventors: Valery Vitalievich Vasiliev, Moscow; Alexandr Fedorovich Razin, Moskovskaya; Alexandr Ivanovich Andronov; Vladimir Alexeevich Salov, both of Moscow, all of Russian Federation

[73] Assignee: McDonell Douglas Corporation, Huntington Beach, Calif.

[21] Appl. No.: 08/960,399

[22] Filed: Oct. 29, 1997

[30] Foreign Application Priority Data

Oct. 29, 1996 [RU] Russian Federation ............. 96121193

[51] Int. Cl.⁷ .................................................. B29D 22/00
[52] U.S. Cl. ........................ 428/36.3; 428/36.91; 428/99; 428/110; 428/107; 244/117 R; 244/123
[58] Field of Search ............................... 428/36.3, 36.91, 428/110, 112, 107, 99; 220/590; 244/123, 117 R, 119, 131, 133; 242/430; 52/524; 24/455; 285/19; 174/66, 67

[56] References Cited

U.S. PATENT DOCUMENTS

| | | | |
|---|---|---|---|
| 3,083,864 | 4/1963 | Young | 220/83 |
| 3,300,354 | 1/1967 | Duft | 156/169 |
| 3,940,891 | 3/1976 | Sylsh | 52/82 |
| 4,012,549 | 3/1977 | Sylsh | 428/116 |
| 4,086,378 | 4/1978 | Kam et al. | 428/36 |
| 4,137,354 | 1/1979 | Mayes, Jr. et al. | 428/116 |
| 4,230,293 | 10/1980 | Hamm et al. | 244/119 |
| 4,278,485 | 7/1981 | Hamm et al. | 156/173 |
| 4,284,679 | 8/1981 | Blad et al. | 428/218 |
| 5,170,967 | 12/1992 | Hamamoto et al. | 244/119 |
| 5,242,523 | 9/1993 | Willden et al. | 156/285 |
| 5,447,765 | 9/1995 | Crane | 428/36.9 |

FOREIGN PATENT DOCUMENTS

| | | |
|---|---|---|
| 0019598 | 5/1980 | European Pat. Off. . |
| 378611 | 4/1973 | U.S.S.R. . |
| 1046445A | 10/1983 | U.S.S.R. . |
| 1057651A | 11/1983 | U.S.S.R. . |
| 1076691A | 2/1984 | U.S.S.R. . |
| 458177A1 | 10/1991 | U.S.S.R. . |
| 533004A1 | 10/1991 | U.S.S.R. . |
| 532209 | 10/1995 | U.S.S.R. . |

*Primary Examiner*—Ellis Robinson
*Assistant Examiner*—Laura L. Lee
*Attorney, Agent, or Firm*—Alston & Bird LLP

[57] ABSTRACT

A composite shell which can be used, in particular, in the manufacture of bodies or compartments of flying vehicles used in rocketry or aeronautics, comprises a load-bearing framework formed of intersecting stiffening ribs, and an outer load-bearing shell. Box-shaped cover plates are secured with glue an the cross nodes of the stiffening ribs from the internal surface of the framework, and thin-walled plates are secured at the outer surface of the shell by threaded rod elements that pass through the shell and framework and are connected to the box-shaped cover plates. In one embodiment, the composite shell is formed of a plurality of panels connected together at their abutting edges. A connection joint between adjacent panels is formed by connecting elements in the form of box-shaped cover plates of a rectangular cross-section that span the connection joint between the panels and are mounted on the interior surfaces of the panels, and plates mounted, on the outer surfaces of the panels spanning the joint and connected to the box-shaped cover plates by threaded rod elements.

7 Claims, 4 Drawing Sheets

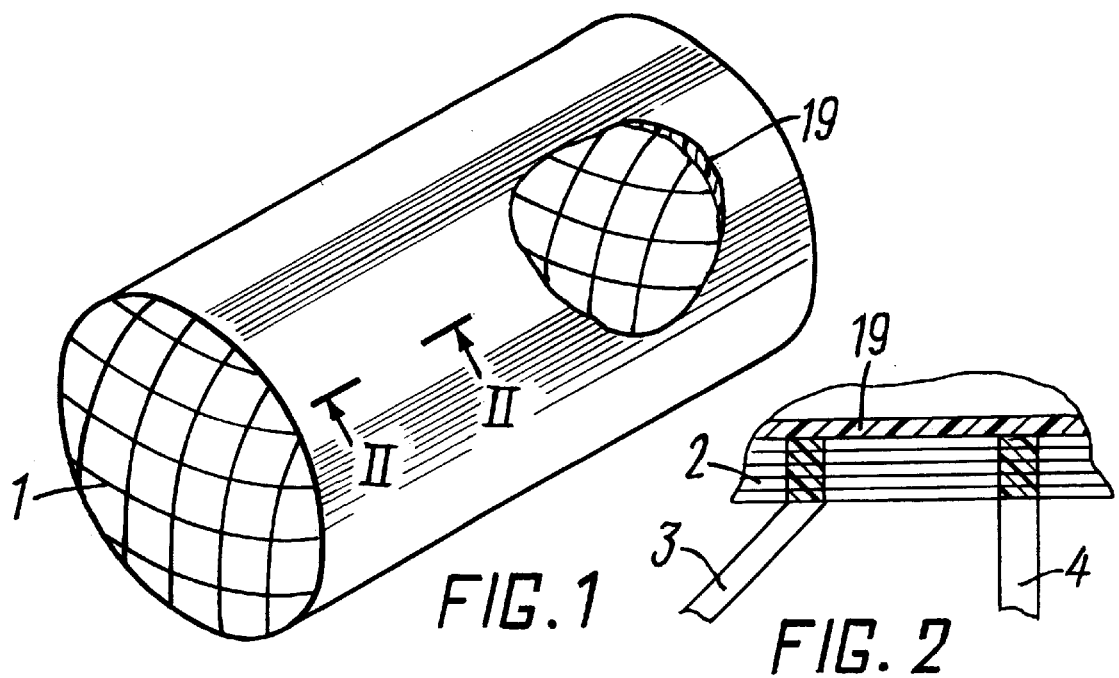
FIG. 1
FIG. 2
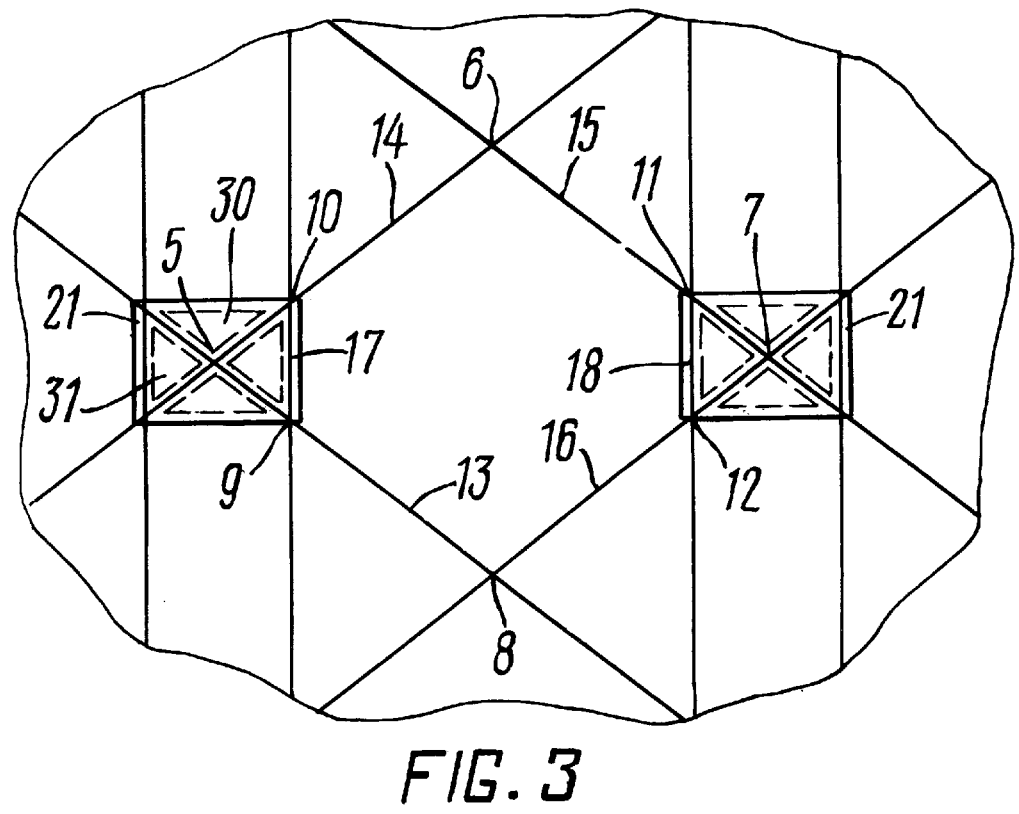
FIG. 3

COMPOSITE SHELL SHAPED AS A BODY OF REVOLUTION, AND PANEL CONNECTION JOINT

BACKGROUND OF THE INVENTION

The invention relates as a whole to composite structures and may be used, in particular, in the manufacture of bodies or compartments of flying vehicles used in rocketry or aeronautics.

Stringent requirements are imposed upon composite shells shaped as a body of revolution in what concerns their strength and reliability, and the products must have a minimum weight. However, when the weight is reduced, the wall thickness decreases and there arises a danger of premature destruction of the product because of reduction of its strength. Therefore, in the composite shells shaped as a body of revolution, in the panels and in their connection joints are introduced various reinforcements.

Known in the art is a composite shell shaped as a body of revolution, comprising a load-bearing framework of a cellular structure consisting of crossing spiral and annular strips (U.S. Pat. No. 3,083,864, cl. 220-83, 1963).

Known in the art is another composite shell shaped as a body revolution, comprising a load-bearing framework of a cellular structure consisting of intersecting unidirectional fibers, and an outer load-bearing shell (U.S. Pat. No. 4,137,354, cl. 428-116, 1979).

In a composite shell shaped as a body of revolution (U.S. Pat. No. 4,284,679, cl. 428-218, 1981) comprising a load-bearing framework of a cellular structure, formed of layers repeating throughout the thickness of the wall and consisting of systems of crisscrossed spiral and annular strips, made of unidirectional fibers, forming stiffening ribs and cross nodes; and an outer load-bearing shell, between the strips are provided load-bearing interlayers. To improve stability of the ribs (U.S. Pat. No. 4,278,485, cl. 156-173, 1981) in the cells between the ribs are introduced foam plastic inserts having edge formers of a composite material.

Most close by its technical essence is a composite shell shaped as a body of revolution disclosed in U.S. Pat. No. 4,284,679 and chosen as the prototype, in which composite shell the intersecting spiral and annular strips are concentrated in cross nodes, that increases their structural depth and weakens relationship between the strips in the ribs, makes worse the quality and reliability of the structure, reduces the efficiency of its operation in the conditions of complicated stressed state.

Known in the art is a panel having a skin and strengthening elements in the form of ribs sagging towards the panel (USSR Inventor's Certification No. 1076691, F16S, 1/00, 1984).

It should be noted that such sagging is permissible as technological sagging, but not as structural sagging. Sagging results from technological shrinkage stresses, which are undesirable for the structure.

Known in the art is a composite panel comprising a load-bearing framework in the form of ribs, and a load-bearing shell covering said framework (USSR Inventor's Certificate No. 1046445, B32B 3/12, 1983).

In said panel structure is used complicated framing of the joint surfaces.

The most close analog, chosen as the prototype, is a composite panel disclosed in USSR Inventor's Certificate No. 1046445.

Known in the art is a joint connecting composite panels, said joint comprising their frameworks of a cellular structure formed of layers repeating throughout the thickness of their walls and consisting of systems of intersecting strips forming cross nodes and stiffening ribs therebetween, with outer load-bearing shells and connecting threaded rod elements (USSR Inventor's Certificate No. 1057651, F16S 1/02, 1983).

Known in the art is a number of connections, in which is not ensured reliable fixing of the panels in the joint.

In the composite panel connection joints (USSR Inventor's Certificate No. 458177, B64C 3/26, 1991) the filler is in the form of sheets changing beyond the joint into fibers. In the Russian Federation Pat. No. 532209, B64C 3/26, 1995, the panel structures are connected with the use of multi row combs, wherein the longitudinal rows are arranged at different angles for securing a reinforcing material.

In the USSR Inventor's Certificate No. 533004, F16B 5/02, 1981, structural members are connected by gaskets having cut-outs for more reliable securing of a reinforcing material.

The reinforcing elements of the joint may be made in the form of foil interlayers (USSR Inventor's Certificate No. 378611, F16B 5/02, 1983).

In a panel connection joint (EPO application No. 0019598, F16S 1/12, 1980) the flanges are joined in overlap by threaded elements.

The most close analog chosen as the prototype is a connection joint disclosed in Inventor's Certificate No. 1057651.

BRIEF DESCRIPTION OF THE INVENTION

The main object of the present invention is to create a composite shell shaped as a body of revolution, a composite panel and panel connection joints of such structures, in which would be eliminate the above-mentioned disadvantages.

A composite shell, a composite panel and panel connection joint according to the present invention have improved rigidity, strength and reliability at a minimum weight of the structure.

The main object and the technical results are achieved by changing the structure by introducing new structural members and their coupling with a load-bearing framework of the shell and panels.

A composite shell shaped as a body of revolution comprises a load-bearing framework of a multilayer structure, formed of layers repeating throughout the thickness of its wall and consisting of systems of intersecting spiral and annular strips arranged at intervals and forming cross nodes and stiffening ribs therebetween, and an outer load-bearing shell made of unidirectional fibers bound by a polymer binder, said framework is additionally provided with box-like cover plates of a rectangular cross-section, which cover plates are bonded with glue in the cross nodes and surround them, the outer shell is provided with thin-walled plates mounted on its external surface, said cover plates are arranged along the generating lines of the internal surface of the shell and are connected to the plates by the rod like threaded elements and form reinforcement zones which are uniformly arranged along the shell contour, the box-like cover plate has a symmetrical rectangular section and a narrowed neck in the middle portion, between the box-like cover plates and cross nodes are secured with glue shaped inserts. The shell may be made of individual panels, coupled in axially radial planes, arranged in zones, at the panel connection points the cross nodes are made of symmetrical half portions having plane transverse faces and are secured by glue seams.

In a composite panel comprising a load-bearing framework in the form of stiffening ribs and having a covering load-bearing shell, the load-bearing framework is made of intersecting spiral and annular strips forming cross nodes and stiffening ribs between the nodes, the transverse faces of the stiffening ribs and cross nodes, which faces are arranged on the panel faces, lying in the radially axial plane, and are plane.

In a composite panel connection joint comprising panels having a framework of a cellular structure formed of layers repeating throughout the thickness of its walls and consisting of intersecting strips forming cross nodes and stiffening ribs between the nodes, and an outer load-bearing shell, connecting elements, the cross nodes and the stiffening ribs of the framework in the axially radial planes of conjugation of the panels are made with plane transverse faces and are provided with box-like cover plates surrounding them and secured with glue on the framework, the outer shell is provided with thin-walled plates mounted on the external surface and secured to the cover plates by the threaded rod elements and glue. The box-like cover plates have narrowed necks in the middle portion, between the box-like cover plates and the cross nodes are mounted shaped inserts of composite materials, for example, polymeric materials.

A composite shell comprising a load-bearing framework of a cellular structure is reinforced with box-like cover plates and thin-walled plates, respectively mounted along the generating line of the internal surface of the loading-bearing framework to embrace the nodes of intersections of crossing ribs and on the external surface of the load-bearing shell in the uniformly arranged zones of its reinforcement.

When the shell is made of panels, the planes of the panel joints or the planes in which the panels are joined should be arranged in the axial direction to symmetrically divide the nodes of intersections into half portions having plane faces to be joined, that allows to reliably fix the divided nodes into united nodes by the box-like cover-plates, plates, threaded rod elements and glue.

Depending on angles of inclinations of the spiral ribs, in the nodes of intersection there may be used box-like cover plates with the narrowed necks and inserts, that prevents deformation of the nodes, their displacement or exposure of the joints therein.

Such novel technical solutions allow to obtain the composite shells of high reliability, strength at a minimum weight thereof.

DESCRIPTION OF THE DRAWINGS

FIG. 1 is a general view a composite shell shaped as a body of revolution;

FIG. 2 is a sectional view taken along line II—II of FIG. 1;

FIG. 3 shows a fragment of the load-bearing framework;

DETAILED DESCRIPTION OF THE INVENTION

Figure 6:
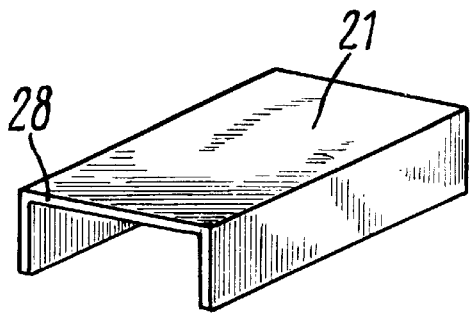
FIG. 6 shows a box-like cover plate.
Figure 7:
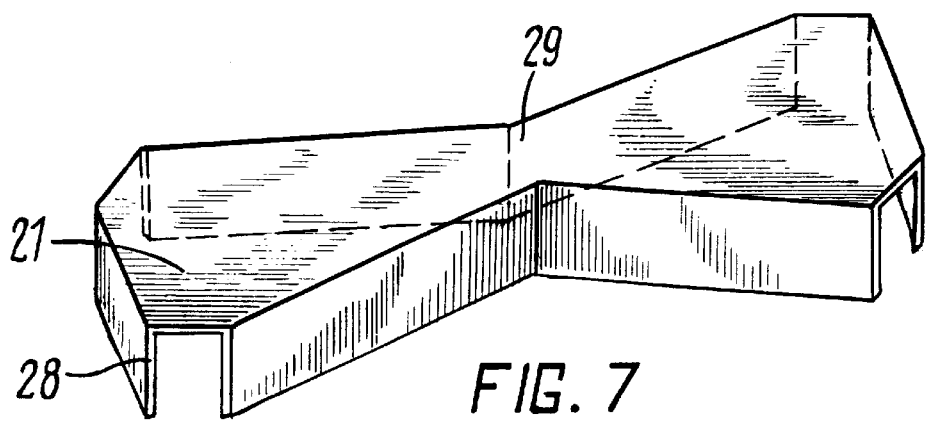
FIG. 7 shows a box-like cover plate having a narrowed neck in the middle portion thereof.
Figure 8:
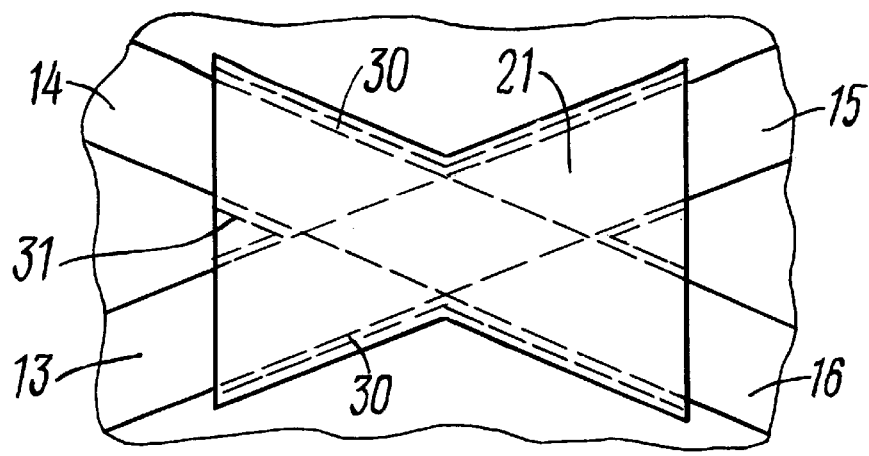
FIG. 8 shows a connection joint with a box-like cover plate and shaped inserts.
Figure 9:
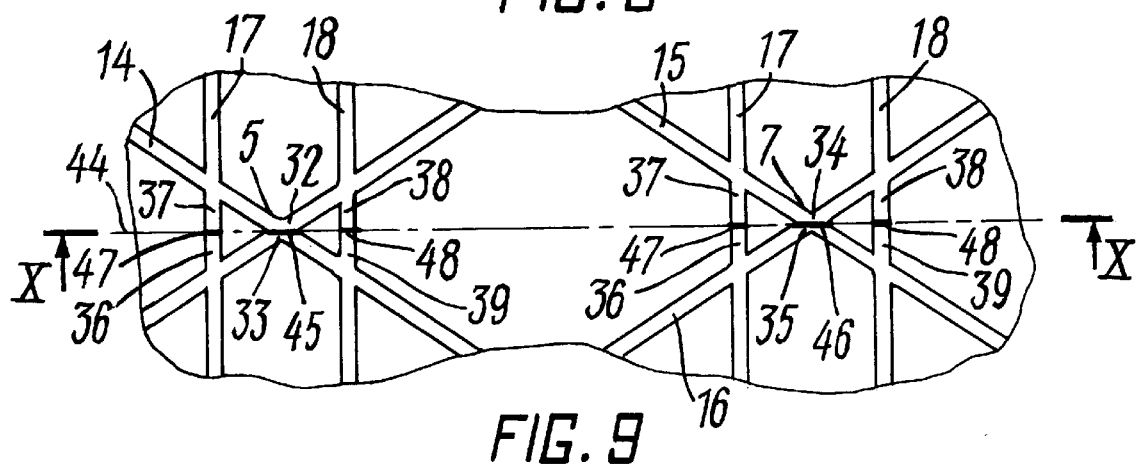
FIG. 9 shows cross nodes of the stiffening ribs, which node is formed of half portions having plane end faces.
Figure 10:
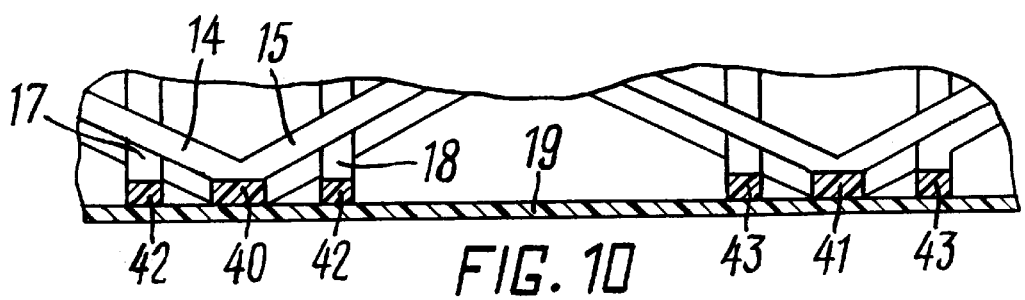
FIG. 10 is a sectional view taken along line X—X of FIG. 9.

A composite shell shaped as a body of revolution comprises a load-bearing framework 1 of a multilayer structure (FIG. 1), formed of layers 2 repeating throughout the thickness of its wall and consisting of systems of intersecting spiral and annular strips 3, 4 (FIG. 2) arranged at intervals and forming cross nodes 5–8, 9–12 and spiral and annular stiffening ribs 13–16 and 17, 18 therebetween (FIG. 3) and an outer load-bearing shell 19 (FIG. 1, FIG. 2) made of unidirectional fibers bound by a polymer binder. The load-bearing framework 1 is provided with box-like cover plates 21 (FIGS. 5, 6) secured with glue along the generating lines of an internal surface 20 (FIG. 3) in cross nodes 5, 7 of the spiral ribs 13, 14 and 15, 16; said cover plates surround the cross nodes, and the outer shell 19 (FIG. 4) is provided with thin-walled plates 22 mounted on an external surface 23 and is connected to the cover plates by threaded elements 24. The cover plates and the plates form reinforcement zones 26 which are uniformly arranged along the shell contour. The box-like cover plates 21 (FIG. 7) have a symmetrical rectangular section 28 and narrow necks 29 in the middle portion. Between the box-like cover plates 21 and cross nodes 5, 7 of the spiral stiffening ribs 13, 14 and 15, 16 are secured with glue shaped inserts 30, 31 of composite materials, for example, polymeric materials (FIG. 8). The cross nodes 5, 7 of the spiral stiffening ribs 13, 14 and 15, 16 and the annular stiffening ribs 17, 18 (FIG. 3) zones 26 reinforced by the box-like cover plates 21 and thin-walled plates 22 (FIG. 4) are formed of their symmetrically arranged half portions 31, 33 and 34, 35, and 36, 37 and 38, 39 (FIG. 9) having a plane end faces 40, 41 and 42, 43 (FIG. 10) lying in axially radial planes 44 of conjugation of panels 27 secured by glue seams 45, 46 and 47, 48 (FIG. 9).

Figure 12:
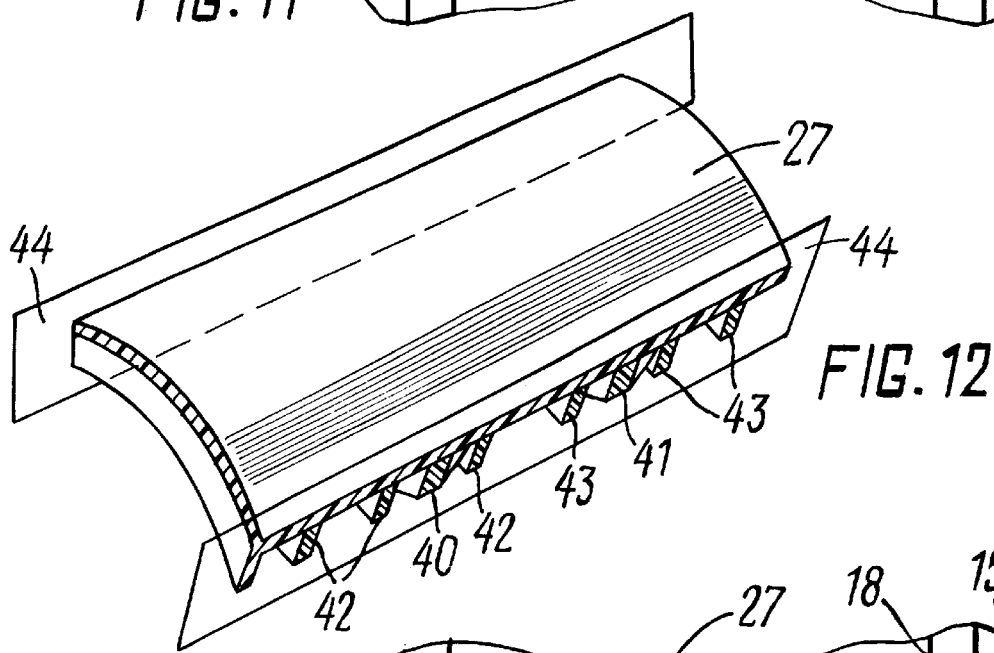
FIG. 12 is a general view of a composite panel.
Figure 13:
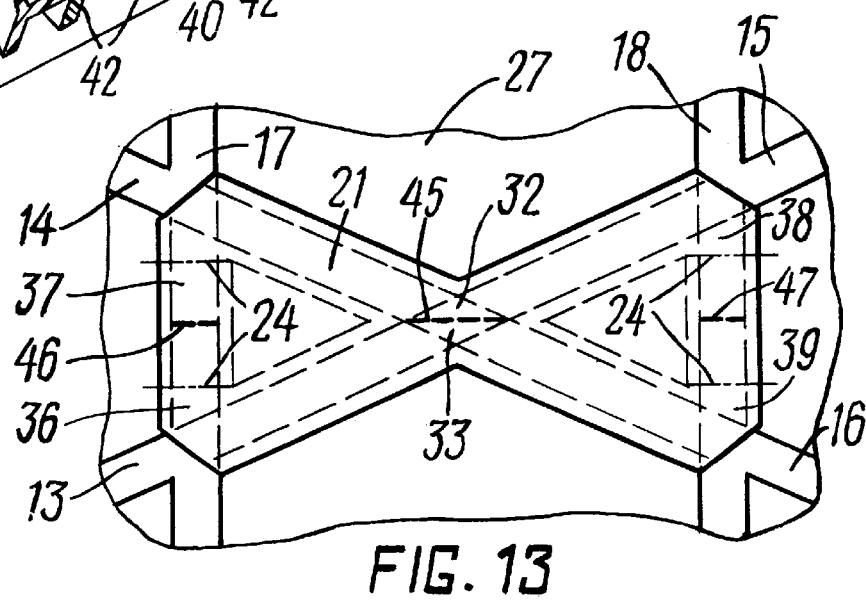
FIG. 13 shows a panel connection joint wherein the panels are connected by the cover plate and inserts.

The composite panel 27 (FIG. 4, FIG. 12) comprises a part of the load-bearing framework 1 formed by the intersecting spiral and annular ribs 13–16, and 17–18 and the load-bearing shell 19 covering it. The half portions 36 and 37 of the nodes of intersections of the spiral ribs (FIG. 9) have plane faces 40, 41 and 42, 43 (FIG. 10) lying in lateral plane 44 (FIG. 12).

Connection joints of panels 27 have box-like cover plates 21 (FIG. 7) of a rectangular cross-section 28, said cover plates encompassing half portions 32, 33 and 36, 37 and 39 of the cross nodes 5, 7 of the spiral stiffening ribs 13, 14 and 15, 16 and annular stiffening ribs 17, 18 of the load-bearing framework 1; thin-walled plates 22 mounted on the external surface 23 of the panels (FIG. 4); connecting threaded rod elements 24; and glue seams 45, 46 and 47. In connection joints of panels 27, in the reinforcement zones 26 of the shell the box-like cover plates 21 have a rectangular cross-section 28 and narrowed necks 29 in the middle portion, between the box-like cover plates 21 and the nodes 5, 7 may be secured with glue shaped inserts 30, 31 of composite materials, for example, polymeric materials.

Figure 4:
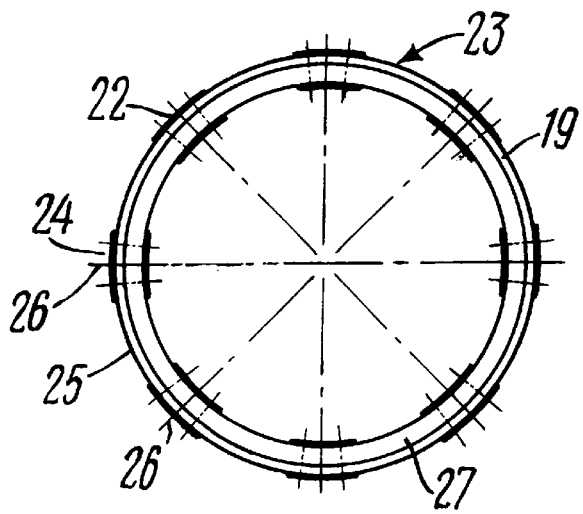
FIG. 4 is an end view of the shell.
Figure 5:
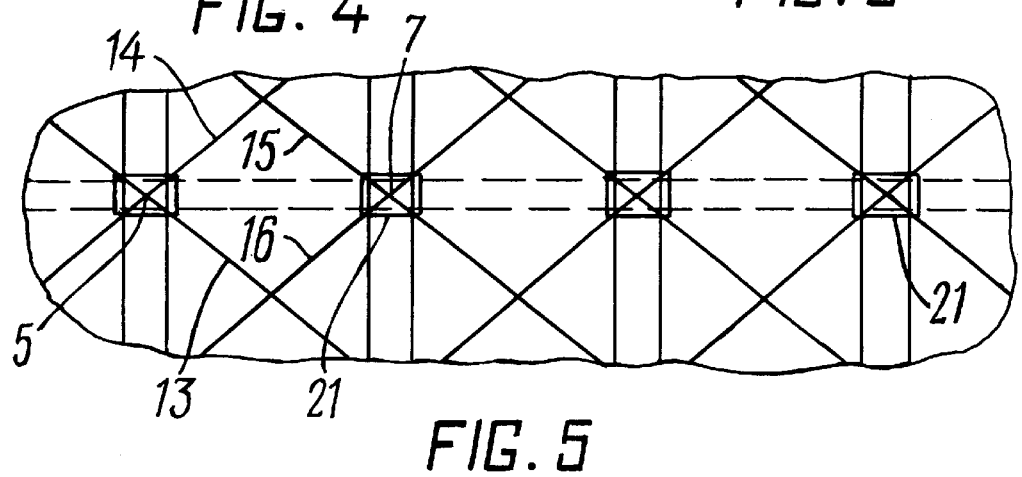
FIG. 5 shows schematically arrangement of reinforcements of the nodes of intersections of the ribs.
Figure 11:
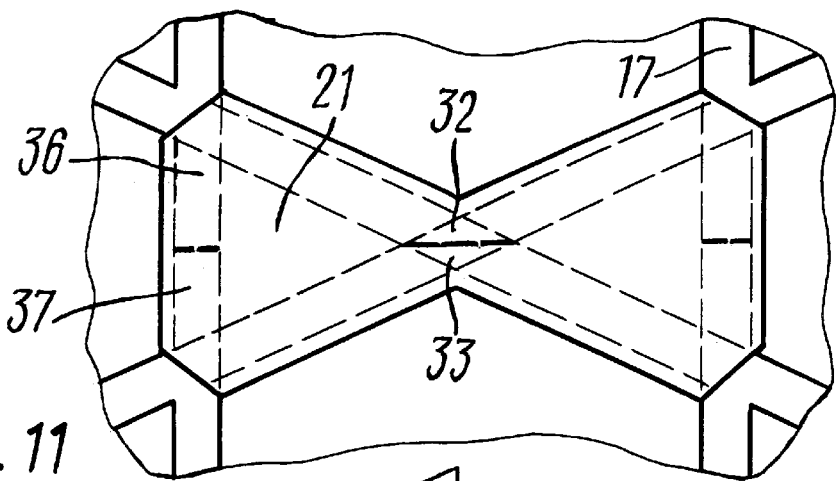
FIG. 11 shows assembly of the cross node and cover plate.

Manufacture of a composite shell and composite panels includes: applying and securing to the surface of a mandrel flexible plates (not shown) having a net of intersecting grooves for the strips made of fibers for shaping from them spiral and annular stiffening ribs; winding the strips impregnated with a binder to form spiral and annular ribs 13–16 and 17, 18 of the framework 1 and outer load-bearing shell 19 which are made of unidirectional fibers impregnated with a polymer binder; polymerization of a binder; removal of the mandrel and flexible plates. In reinforcement zones 26 along the generating lines are secured with glue the cover plates 21 surrounding the cross nodes 5, 7 (FIG. 8) or said nodes and annular ribs 17, 18 (FIG. 11). In case of clearances or gaps, between the box-like cover plates 21 and said nodes are mounted shaped inserts 30, 31. When the overall dimensions of the shell are large, the panels 27 are manufactured in accordance with a similar technology to obtain a predetermined structure. On the half portions 32, 34, 36 and 38 of the side faces of panels 27 are provided plane faces 40, 41 and 42, 43, lying in axially radial planes 44, by which the panels 27, when connected to each other with glue, form in the reinforcement zones 26 strong glue seams 45, 46 and 47, 48. The panels are connected with the box-like cover plates 21, thin-walled plates 22 and connecting threaded rod elements 24 (FIG. 4). Integrally connected panels 27 improve the rigidity, strength and reliability of the shell. When such shell is loaded with external loads, for example, compressive loads, the nodes of intersecting stiffening ribs in the reinforcement zones 26 take up similar forces as the nodes of intersections of the stiffening ribs between the reinforcement zones 26, without exposure of the joints of panels 27 owing to reinforcements in the form of box-like cover plates 21 and plates 22, that makes the whole structure reliable and efficient.

Composite shells, panels and their connection joints made with the use of new technical solutions were subjected to tests for checking their efficiency, the test results were positive.

The new composite shells are industrially reproducible and give a new technical result.

The claimed technical solutions according to the present invention allow production of high-quality products for body elements of flying vehicles. Thus, the shells described above by their structure in the claimed embodiments are novel and efficient in comparison with the prior art.

The scope of the claimed invention should be understood wider than that concrete embodiment shown in the specification, the claims and the drawings. It should be kept in mind, that the form of the invention represents only possible, preferable embodiments thereof, may be used various embodiments of the invention relating to the shape, dimensions and arrangement of individual elements, if all this is within the scope of the invention set forth in the claims.

Besides, the claimed invention is not limited in its use only to the shells for flying vehicles and may be also used in other fields wherein it is required to use composite shells shaped as a body of revolution, panels and their connection joints having improved strength and reliability and other properties described in the materials of this application.

That which is claimed:

1. A composite shell shaped as a body of revolution, comprising:

a load-bearing framework of a multilayer structure made of layers repeating throughout the thickness of its wall and consisting of systems of crossing spiral and annular strips arranged at intervals and forming cross nodes and stiffening ribs therebetween;

an outer load-bearing shell;

said spiral and annular strips and the outer load-bearing shell being formed of unidirectional fibers and a polymer binder bonding said unidirectional fibers;

box-shaped cover plates of rectangular cross-section, which are secured with glue in the cross nodes and surround them;

thin-walled plates mounted on an external surface of the outer shell; and said box-like cover plates, arranged along an internal surface of said load-bearing framework, are secured to said thin-walled plates by threaded rod elements to form reinforcement zones arranged uniformly along the contour of the shell.

2. A shell according to claim 1, wherein said box-shaped cover plates have a narrowed neck in the middle portion.

3. A shell according to claim 1, wherein between the box-shaped cover plates and the cross nodes are secured with glue shaped inserts.

4. A shell according to claim 1, is made of separate panels, coupled in the axially radial planes, arranged in the reinforcement zones to form the cross nodes at the points where the panels consisting of symmetrical half portions are coupled with the plane transverse faces, secured by glue seams.

5. Composite panel connection joint comprising:

panels having a framework of a cellular structure made of layers repeating throughout the thickness of its walls and consisting of crossing strips forming cross nodes and stiffening ribs therebetween, said panels having opposing edges and being joined at said edges along plane transverse faces of said panels to form a joint, said plane transverse faces of each panel lying in an axially radial plane and being defined by plane faces of said cross nodes and stiffening ribs;

an outer load-bearing shell disposed on outer surfaces of said panels so as to form an external surface;

box-shaped cover plates of a rectangular cross-section surrounding the cross nodes and stiffening ribs of the panels and spanning said joint between the panels, said box-like cover plates being disposed along inner surfaces of the panels and secured to the panels and to the cross nodes and stiffening ribs thereof with glue;

thin-walled plates mounted on the external surface along said joint and secured to the cover plates by connecting elements in the form of threaded rod elements.

6. A joint according to claim 5, wherein the box-shaped cover plates have narrowed necks in the middle portion.

7. A joint according to claim 5, wherein between the box-shaped cover plates and the cross nodes are mounted shaped inserts of composite materials, for example, polymeric materials.

* * * * *

UNITED STATES PATENT AND TRADEMARK OFFICE
CERTIFICATE OF CORRECTION

PATENT NO. : 6,068,902
DATED : May 30, 2000
INVENTOR(S) : Vasiliev et al.

It is certified that error appears in the above-identified patent and that said Letters Patent is hereby corrected as shown below:

Title page,
Item [73], Assignee, insert as the First Assignee -- Centr Perspektivnykh Razrabotok, Khutkovo, Russia --; "McDonell" should read -- McDonnell --.
Item [56], References Cited, U.S. PATENT DOCUMENTS, lines 3 and 4, "Sylsh" should read -- Slysh --.
Item [57], ABSTRACT, line 6, "an" should read -- in --; line 17, after "mounted" cancel the comma (,).

Column 4,
Line 41, "31" should read -- 32 --.

Signed and Sealed this

Eighteenth Day of September, 2001

Attest:

NICHOLAS P. GODICI
Attesting Officer
Acting Director of the United States Patent and Trademark Office